United States Patent
Yan et al.

(10) Patent No.: US 11,610,380 B2
(45) Date of Patent: Mar. 21, 2023

(54) METHOD AND COMPUTING DEVICE FOR INTERACTING WITH AUTOSTEREOSCOPIC DISPLAY, AUTOSTEREOSCOPIC DISPLAY SYSTEM, AUTOSTEREOSCOPIC DISPLAY, AND COMPUTER-READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Guixin Yan, Beijing (CN); Hao Zhang, Beijing (CN); Lili Chen, Beijing (CN); Minglei Chu, Beijing (CN); Wenhong Tian, Beijing (CN); Zhanshan Ma, Beijing (CN); Ziqiang Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/700,039

(22) Filed: Dec. 2, 2019

(65) Prior Publication Data

US 2020/0234509 A1 Jul. 23, 2020

(30) Foreign Application Priority Data

Jan. 22, 2019 (CN) .......................... 201910059254.3

(51) Int. Cl.
*G06T 19/20* (2011.01)
*H04N 13/302* (2018.01)
(Continued)

(52) U.S. Cl.
CPC .............. *G06T 19/20* (2013.01); *G02B 30/26* (2020.01); *H04N 13/117* (2018.05); *H04N 13/302* (2018.05)

(58) Field of Classification Search
CPC .... G06T 19/20; H04N 13/117; H04N 13/302; H04N 13/239; G02B 30/26; G06F 3/011; G06F 3/017
See application file for complete search history.

(56) References Cited

U.S. PATENT DOCUMENTS 7,787,009 B2 * 8/2010 Alpaslan .............. H04N 13/317
  348/51
9,600,714 B2 * 3/2017 Nam ......................... G06T 7/73
(Continued)

FOREIGN PATENT DOCUMENTS

CN  102981616 A  3/2013
CN  105094294 A  11/2015
(Continued)

OTHER PUBLICATIONS

Sandin, The VarrierTM Autostereoscopic Virtual Reality Display, Siggraph 2005 (Year: 2005).*
(Continued)

*Primary Examiner* — Phuc N Doan
(74) *Attorney, Agent, or Firm* — Myers Bigel, P.A.

(57) ABSTRACT

A method for interacting with an autostereoscopic display is disclosed. The method includes initiating displaying by the autostereoscopic display a left eye view and a right eye view that contain a virtual manipulated object, determining a real-world coordinate of the virtual manipulated object perceived by a user located at a predetermined viewing position of the auto stereoscopic display, receiving an interactive action of the user's manipulating body acquired by a motion tracker, where the interaction action includes a real-world coordinate of the manipulating body, determining
(Continued)

whether an interaction condition is triggered based at least in part on the real-world coordinate of the virtual manipulated object and the real-world coordinate of the manipulating body, and refreshing the left eye view and the right eye view based on the interactive action of the manipulating body acquired by the motion tracker, in response to determining that the interaction condition is triggered.

12 Claims, 4 Drawing Sheets

(51) Int. Cl.
*G02B 30/26* (2020.01)
*H04N 13/117* (2018.01)

(56) References Cited

U.S. PATENT DOCUMENTS

| | | | | |
|---|---|---|---|---|
| 10,192,358 | B2* | 1/2019 | Robbins | G02B 27/0103 |
| 2006/0012675 | A1* | 1/2006 | Alpaslan | H04N 13/366 |
| | | | | 348/E13.043 |
| 2010/0128112 | A1* | 5/2010 | Marti | G06F 3/011 |
| | | | | 348/E13.001 |
| 2011/0254837 | A1* | 10/2011 | Kang | H04N 13/398 |
| | | | | 345/419 |
| 2012/0113223 | A1* | 5/2012 | Hilliges | G06F 3/011 |
| | | | | 348/46 |
| 2012/0117514 | A1* | 5/2012 | Kim | G06F 3/011 |
| | | | | 715/849 |
| 2012/0270653 | A1 | 10/2012 | Kareemi et al. | |
| 2012/0319946 | A1* | 12/2012 | El Dokor | A63F 13/00 |
| | | | | 345/156 |
| 2012/0326963 | A1* | 12/2012 | Minnen | G06F 3/0304 |
| | | | | 345/156 |
| 2013/0058565 | A1* | 3/2013 | Rafii | G06V 40/113 |
| | | | | 382/154 |
| 2013/0100008 | A1* | 4/2013 | Marti | G06F 3/016 |
| | | | | 345/156 |
| 2013/0136302 | A1* | 5/2013 | Nam | G06K 9/00281 |
| | | | | 382/103 |
| 2013/0342671 | A1 | 12/2013 | Hummel et al. | |
| 2014/0062710 | A1* | 3/2014 | Wu | H04N 13/302 |
| | | | | 340/686.1 |
| 2014/0119599 | A1* | 5/2014 | Dal Mutto | G06F 3/011 |
| | | | | 382/103 |
| 2015/0057082 | A1* | 2/2015 | Kareemi | A63F 13/44 |
| | | | | 463/32 |
| 2015/0061998 | A1* | 3/2015 | Yang | G06F 3/04815 |
| | | | | 345/156 |
| 2015/0301596 | A1 | 10/2015 | Qian et al. | |
| 2016/0203360 | A1* | 7/2016 | Alvarez | G06F 3/04845 |
| | | | | 345/156 |
| 2016/0239080 | A1* | 8/2016 | Margolina | G06T 19/20 |
| 2017/0103583 | A1* | 4/2017 | Poulos | G06F 3/013 |
| 2017/0309057 | A1* | 10/2017 | Vaganov | H04N 13/20 |
| 2018/0196585 | A1* | 7/2018 | Densham | G05B 11/01 |
| 2019/0102927 | A1* | 4/2019 | Yokokawa | G06T 13/40 |
| 2019/0121522 | A1* | 4/2019 | Davis | G02B 27/017 |
| 2020/0368616 | A1* | 11/2020 | Delamont | A63F 13/213 |

FOREIGN PATENT DOCUMENTS

| | | |
|---|---|---|
| CN | 105282532 A | 1/2016 |
| CN | 107430437 A | 12/2017 |

OTHER PUBLICATIONS

Kobayashi, Character Interaction System with Autostereoscopic Display and Range Sensor, IEEE Symposium on 3D User Interfaces Mar. 10-11, 2007 (Year: 2007).*

Zhang, Three-dimensional interaction and autostereoscopic display system using gesture recognition, Journal of the SID 21/5, 2013, pp. 203-208 (Year: 2013).*

Office Action for CN application No. 201910059254.3 dated Dec. 12, 2022, with machine translation, 9 pages.

* cited by examiner

110

METHOD AND COMPUTING DEVICE FOR INTERACTING WITH AUTOSTEREOSCOPIC DISPLAY, AUTOSTEREOSCOPIC DISPLAY SYSTEM, AUTOSTEREOSCOPIC DISPLAY, AND COMPUTER-READABLE STORAGE MEDIUM

CROSS-REFERENCE TO RELATED APPLICATIONS

The present application claims the priority of Chinese Patent Application No. 201910059254.3, filed on Jan. 22, 2019, the entire disclosure of which is incorporated herein by reference.

TECHNICAL FIELD

The present application relates to the field of interaction technologies, and in particular, to a method and computing device for interacting with an autostereoscopic display, an autostereoscopic display system, an autostereoscopic display, and a computer-readable storage medium.

BACKGROUND

Virtual reality or augmented reality currently finds applications in many scenarios. Typically, a user perceives a three-dimensional (3D) virtual object by wearing stereo glasses and then interacts with the perceived 3D virtual object. However, the inventors of the present application find that this kind of interaction is less immersive, resulting in a poor use experience.

SUMMARY

According to some embodiments of the present disclosure, a method is provided for interacting with an autostereoscopic display. The method comprises: initiating displaying by the autostereoscopic display a left eye view and a right eye view that contain a virtual manipulated object; determining a real-world coordinate of the virtual manipulated object perceived by a user located at a predetermined viewing position of the autostereoscopic display; receiving an interactive action of the user's manipulating body acquired by a motion tracker, wherein the interaction action comprises a real-world coordinate of the manipulating body; determining whether an interaction condition is triggered based at least in part on the real-world coordinate of the virtual manipulated object and the real-world coordinate of the manipulating body; and refreshing the left eye view and the right eye view based on the interactive action of the manipulating body acquired by the motion tracker, in response to determining that the interaction condition is triggered.

In some embodiments, the determining the real-world coordinate of the virtual manipulated object perceived by the user comprises: determining a first spatial coordinate of the virtual manipulated object perceived by the user in a first coordinate system referencing the autostereoscopic display based on respective positions of the virtual manipulated object in the left eye view and the right eye view, the predetermined viewing position, and an interpupillary distance of the user.

In some embodiments, the determining the real-world coordinate of the virtual manipulated object perceived by the user further comprises: converting the first spatial coordinate to a second spatial coordinate in a second coordinate system referencing the motion tracker.

In some embodiments, the receiving the interactive action of the user's manipulating body acquired by the motion tracker comprises: receiving as the real-world coordinate of the manipulating body, a third spatial coordinate, acquired by the motion tracker, of the manipulating body in a second coordinate system referencing the motion tracker.

In some embodiments, the determining whether the interaction condition is triggered comprises: determining whether a distance between the real-world coordinate of the virtual manipulated object and the real-world coordinate of the manipulating body is less than a first threshold.

In some embodiments, the determining whether the interaction condition is triggered further comprises: determining that the interaction condition is triggered, in response to the distance between the real-world coordinate of the virtual manipulated object and the real-world coordinate of the manipulating body being less than the first threshold.

In some embodiments, the determining whether the interaction condition is triggered further comprises: determining whether the interactive action of the manipulating body is a predetermined posture; and determining that the interaction condition is triggered, in response to the distance between the real-world coordinate of the virtual manipulated object and the real-world coordinate of the manipulating body being less than the first threshold and the interactive action of the manipulating body being the predetermined posture.

In some embodiments, the refreshing the left eye view and the right eye view comprises at least one selected from a group consisting of: translating the virtual manipulated object in the left eye view and the right eye view in response to translation of the manipulating body; rotating the virtual manipulated object in the left eye view and the right eye view in response to rotation of the manipulating body; and deforming the virtual manipulated object in the left eye view and the right eye view in response to deformation of the manipulating body.

According to some embodiments of the present disclosure, a computing device is provided for interacting with an autostereoscopic display. The computing device comprises: a display initiating module configured to initiate displaying by the autostereoscopic display a left eye view and a right eye view that contain a virtual manipulated object; a coordinate determining module configured to determine a real-world coordinate of the virtual manipulated object perceived by a user located at a predetermined viewing position of the auto stereoscopic display; a coordinate receiving module configured to receive an interactive action of the user's manipulating body acquired by a motion tracker, wherein the interaction action comprises a real-world coordinate of the manipulating body; an interaction triggering module configured to determine whether an interaction condition is triggered based at least in part on the real-world coordinate of the virtual manipulated object and the real-world coordinate of the manipulating body; and a view refreshing module configured to refresh the left eye view and the right eye view based on the interactive action of the manipulating body acquired by the motion tracker in response to determining that the interaction condition is triggered.

In some embodiments, the coordinate determining module is configured to: determine a first spatial coordinate of the virtual manipulated object perceived by the user in a first coordinate system referencing the autostereoscopic display based on respective positions of the virtual manipulated object in the left eye view and the right eye view, the predetermined viewing position, and an interpupillary distance of the user.

In some embodiments, the coordinate determining module is further configured to: convert the first spatial coordinate to a second spatial coordinate in a second coordinate system referencing the motion tracker.

In some embodiments, the coordinate receiving module is configured to: receive as the real-world coordinate of the manipulating body, a third spatial coordinate, acquired by the motion tracker, of the manipulating body in a second coordinate system referencing the motion tracker.

In some embodiments, the interaction triggering module is configured to: determine whether a distance between the real-world coordinate of the virtual manipulated object and the real-world coordinate of the manipulating body is less than a first threshold.

In some embodiments, the interaction triggering module is further configured to: determine that the interaction condition is triggered, in response to the distance between the real-world coordinate of the virtual manipulated object and the real-world coordinate of the manipulating body being less than the first threshold.

In some embodiments, the interaction triggering module is further configured to: determine whether the interactive action of the manipulating body is a predetermined posture, and determine that the interaction condition is triggered, in response to the distance between the real-world coordinate of the virtual manipulated object and the real-world coordinate of the manipulating body being less than the first threshold and the interactive action of the manipulating body being the predetermined posture.

In some embodiments, the view refreshing module is configured to perform at least one selected from a group consisting of: translating the virtual manipulated object in the left eye view and the right eye view in response to translation of the manipulating body; rotating the virtual manipulated object in the left eye view and the right eye view in response to rotation of the manipulating body; and deforming the virtual manipulated object in the left eye view and the right eye view in response to deformation of the manipulating body.

According to some embodiments of the present disclosure, an autostereoscopic display system is provided, comprising an autostereoscopic display and a computing device. The computing device comprises: a display initiating module configured to initiate display by the autostereoscopic display a left eye view and a right eye view that contain a virtual manipulated object; a coordinate determining module configured to determine a real-world coordinate of the virtual manipulated object perceived by a user located at a predetermined viewing position of the autostereoscopic display; a coordinate receiving module configured to receive an interactive action of the user's manipulating body acquired by a motion tracker, wherein the interaction action comprises a real-world coordinate of the manipulating body; an interaction triggering module configured to determine whether an interaction condition is triggered based at least in part on the real-world coordinate of the virtual manipulated object and the real-world coordinate of the manipulating body; and a view refreshing module configured to refresh the left eye view and the right eye view based on the interactive action of the manipulating body acquired by the motion tracker in response to determining that the interaction condition is triggered.

In some embodiments, the autostereoscopic display system further comprises the motion tracker.

According to some embodiments of the present disclosure, an autostereoscopic display is provided, which comprises: a memory configured to store an interactive application; and a processor configured to execute the interactive application to implement the method as described above.

According to some embodiments of the present disclosure, a computer-readable storage medium is provided having stored thereon a computer program that, when executed by a processor, implements the method as described above.

BRIEF DESCRIPTION OF THE DRAWINGS

In order to more clearly illustrate the technical solutions in the embodiments of the present application, the drawings used in the description of the embodiments of the present application will be briefly described below.

DETAILED DESCRIPTION

Figure 1:
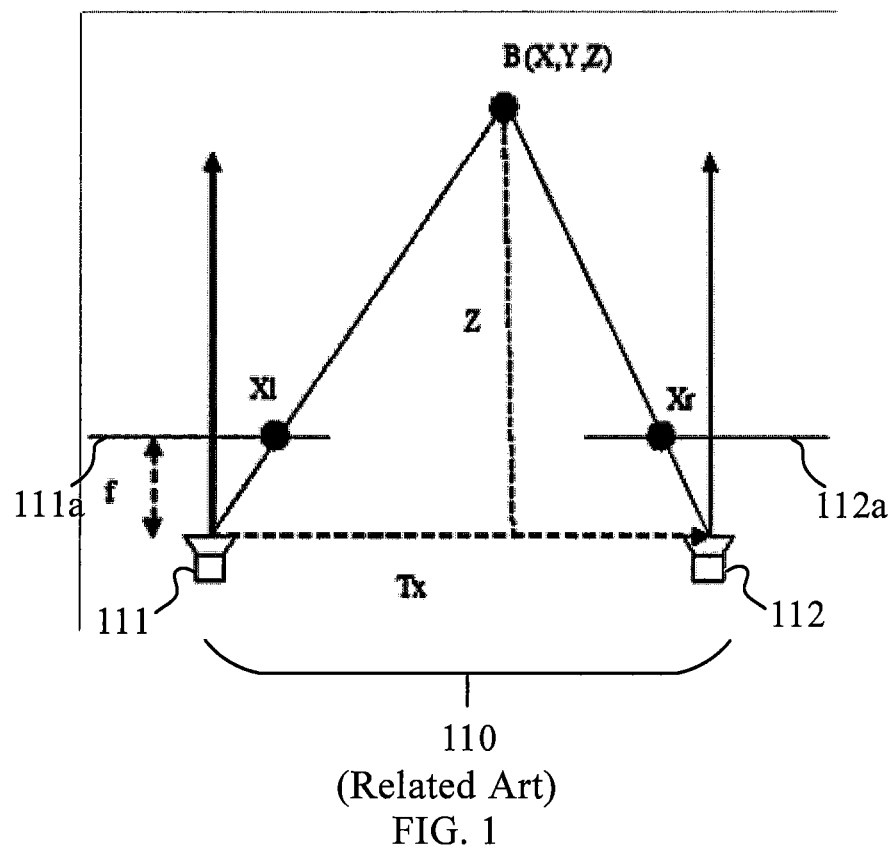
FIG. 1 is a schematic diagram showing how a binocular camera captures a 3D scene.

The following is a detailed description of embodiments of the present disclosure, examples of which are illustrated in the accompanying drawings. The same or similar reference numerals indicate the same or similar elements throughout. The embodiments described below with reference to the accompanying drawings are intended to be illustrative only, and are not to be construed as limiting.

It will be understood by the skilled in the art that the word "comprising" as used herein means the presence of the features, integers, steps, operations, elements and/or components, but does not exclude the presence or addition of one or more other features, integers, steps, operations, elements, components, and/or groups thereof. It is to be understood that when an element is referred to as being "connected" or "coupled" to another element, it can be directly connected or coupled to the other element, or intervening elements may exist. Further, "connected" or "coupled" as used herein may include either a wireless connection or a wireless coupling. The word "and/or" used herein includes all or any one and all combinations of one or more of the associated items listed.

In order to render the objectives, technical solutions and advantages of the present application more clear, embodiments of the present application will be described in detail below with reference to the accompanying drawings.

FIG. 1 is a schematic diagram showing how a binocular camera 110 captures a 3D scene.

The binocular camera 110 includes a left camera 111 having a left imaging plane 111a and a right camera 112 having a right imaging plane 112a. Images acquired by the left camera 111 and the right camera 112 are formed in the left imaging plane 111a and the right imaging plane 112a, respectively, and are recorded as a left eye view and a right eye view, respectively. The left camera 111 and the right camera 112 have consistent internal parameters, such as a focal length f, and the spacing between them is Tx, as indicated by the dashed line (also referred to as baseline) connecting the left camera 111 and the right camera 112 in FIG. 1. The spacing Tx between the left camera 111 and the right camera 112 is approximately equal to an interpupillary distance of an average person.

It is assumed that the left camera 111 is located at an origin coordinate (0, 0, 0), and the right camera 112 is located at a coordinate (Tx, 0, 0). There is an object B in the scene that is placed at a distance Z from the baseline, with a coordinate (X, Y, Z). The x-axis coordinates of the object B in the left eye view and the right eye view are denoted as Xl and Xr, respectively, and the object B has the same y-axis coordinate in the left and right eye views.

Using a principle of triangle similarity, Xl and Xr can be calculated as $$Xl = f\frac{X}{Z} \quad (1)$$

$$Xr = f\frac{Tx - X}{Z} \quad (2)$$

Thus, the coordinates of the object B in the left eye view and the right eye view may already be known when the image is picked up or generated.

Figure 2:
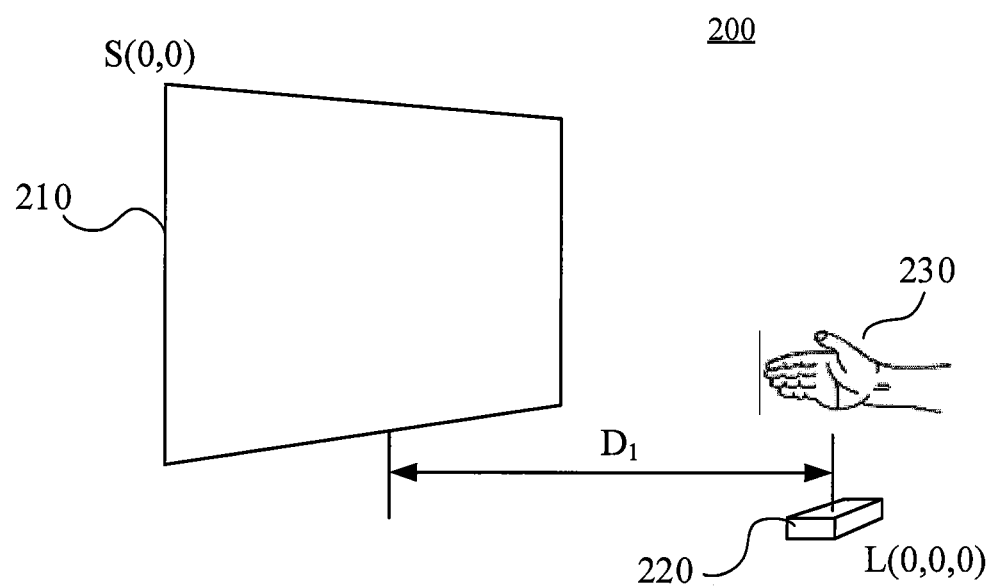
FIG. 2 is a schematic diagram of an example system in which techniques in accordance with embodiments of the present disclosure may be applied.

FIG. 2 is a schematic diagram of an example system 200 in which techniques in accordance with embodiments of the present disclosure may be applied.

The example system 200 includes an autostereoscopic display 210, a motion tracker 220, such as Leap Motion provided by Leap®, and a user's manipulating body 230, such as a hand. The user interacts with the autostereoscopic display 210 through his or her hand 230. For example, when the user views the left eye view and the right eye view displayed on the autostereoscopic display 210, he or she will perceive the virtual manipulated object contained in the left eye view and the right eye view in the three-dimensional space. The user then manipulates the virtual manipulated object by making a particular interactive action, such as translation, rotation, or deformation, to interact with the autostereoscopic display 210.

In the example system 200, there are three coordinate systems: a motion tracker coordinate system, a human eye coordinate system, and a display coordinate system. Shown in FIG. 2 are an origin S(0, 0) of the display coordinate system at the upper left corner of the autostereoscopic display 210 and an origin L(0, 0, 0) of the motion tracker coordinate system at the center of the motion tracker 220.

Figure 3:
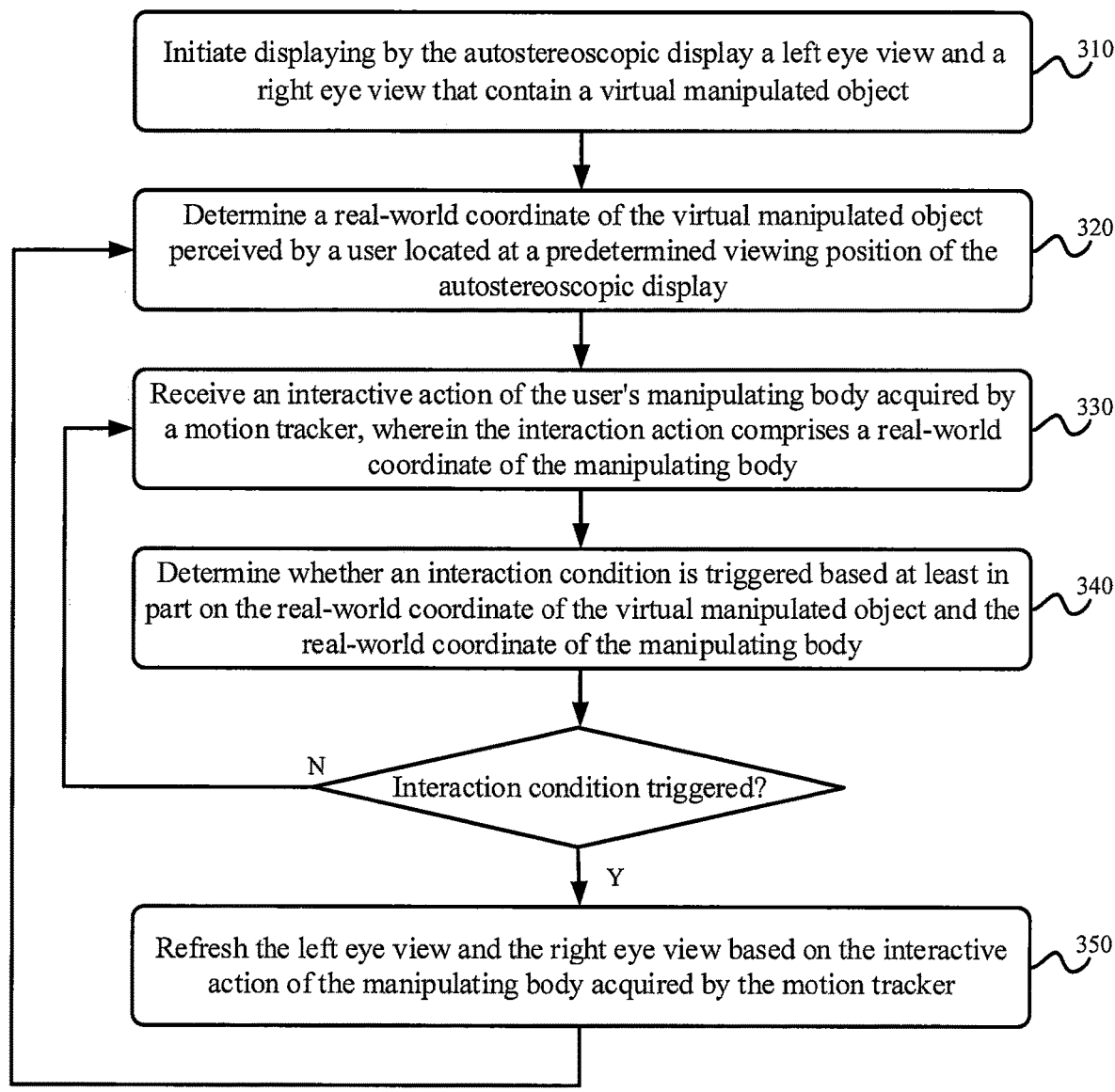
FIG. 3 is a flow chart of a method for interacting with an autostereoscopic display in accordance with an embodiment of the present disclosure.
Figure 4:
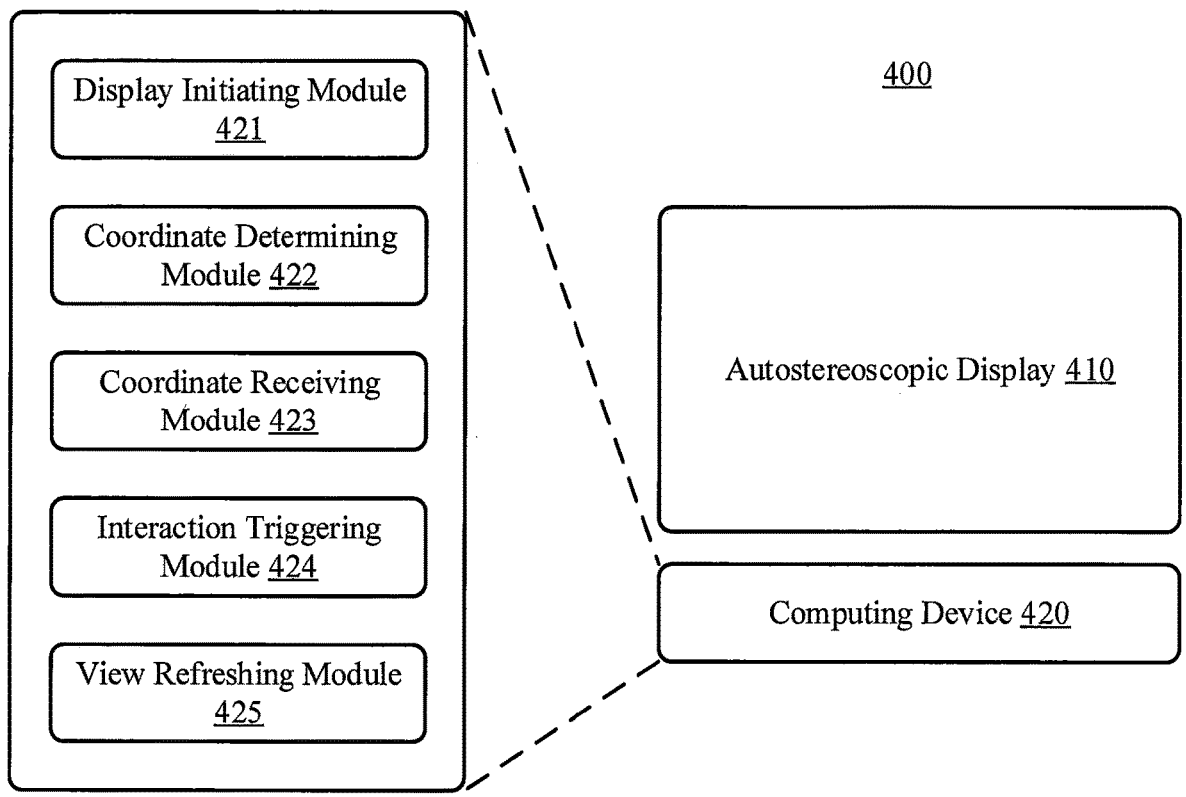
FIG. 4 is a schematic block diagram of an autostereoscopic display system in accordance with an embodiment of the present disclosure.

FIG. 3 is a flow chart of a method 300 for interacting with an autostereoscopic display in accordance with an embodiment of the present disclosure. The example system 200 may operate in accordance with the method 300 in an embodiment. For purposes of illustration, the method 300 is described below with reference to FIG. 4. FIG. 4 illustrates an autostereoscopic display system 400 in accordance with an embodiment of the present disclosure that includes an autostereoscopic display 410 and a computing device 420.

The autostereoscopic display 410 is an example of the autostereoscopic display 210. The computing device 420 may be implemented as an interaction application pre-installed in the autostereoscopic display 410 or downloaded via a network such as the Internet. Alternatively, the computing device 420 may be implemented as a separate device that works with the autostereoscopic display 410 or as hardware components that are integrated into the autostereoscopic display 410. As shown in FIG. 4, the computing device 420 includes a display initiating module 421, a coordinate determining module 422, a coordinate receiving module 423, an interaction triggering module 424, and a view refreshing module 425.

The method 300 of FIG. 3 starts with step 310. At step 310, the display initiating module 421 initiates displaying, by the autostereoscopic display 410, of a left eye view and a right eye view that contain a virtual manipulated object (e.g., a small ball). In some embodiments, the display initiating module 421 is stored as software in a memory (not shown) of the autostereoscopic display 410, and when read and executed, it instructs the autostereoscopic display 410 to begin displaying predetermined left eye views and right eye views to render a virtual manipulated object.

At step 320, the coordinate determining module 422 determines a real-world coordinate of the virtual manipulated object as perceived by the user at a predetermined viewing position of the autostereoscopic display 410. In some embodiments, the coordinate determining module 422 is stored as software in a memory (not shown) of the autostereoscopic display 410, and when read and executed, it operates to determine the real-world coordinate of the virtual manipulated object perceived by the user.

As is known, the autostereoscopic display 410 typically has a limited viewing range in which a viewer can clearly see the 3D object displayed by the autostereoscopic display 410. For ease of description, in the following description, it is assumed that the user is located at an optimal viewing position of the autostereoscopic display 410, which position is known to the autostereoscopic display 410. For example, the optimal viewing position may be at a distance f from the autostereoscopic display 410, where f is a focal length of the binocular camera as shown in FIG. 1. Moreover, at the optimal viewing position, a center of the user's left and right eyes is aligned with a center of the autostereoscopic display 410, meaning that a line connecting the center of the left and right eyes and the center of a screen of the autostereoscopic display 410 is perpendicular to the screen. It will be understood that the left eye view and the right eye view displayed by the autostereoscopic display 410 are not necessarily the images taken by an actual binocular camera, because in the case of computer graphics (CG), the left eye view and the right eye view may be images generated by a computer. In this case, there is still a predetermined optimal viewing position for the autostereoscopic display 410.

Figure 5:
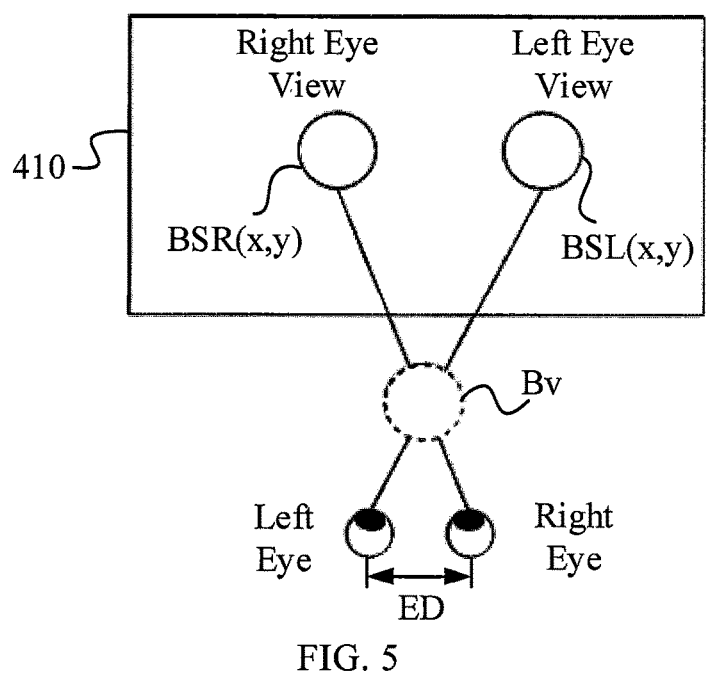
FIG. 5 is a schematic diagram showing how human eyes perceive the virtual manipulated object displayed by an autostereoscopic display.

FIG. 5 shows how human eyes perceive a virtual manipulated object Bv displayed by the autostereoscopic display 410. When the user is at the predetermined optimal viewing position, the user will perceive that the virtual manipulated object Bv is located at an intersection of two lines of sight, one of which is a line connecting a position BSR(x, y) of the virtual manipulated object Bv in the right eye view and the right eye, the other is a line connecting a position BSL(x, y) of the virtual manipulated object Bv in the left eye view and the left eye.

In an embodiment, the coordinate determining module 422 is configured to determine a first spatial coordinate V1(x, y, z) of the virtual manipulated object Bv in a first coordinate system (i.e., the display coordinate system) referencing the autostereoscopic display 410 based on respective positions of the virtual manipulated object Bv in the left eye view and the right eye view, the predetermined viewing position, and the user's interpupillary distance. In the example of FIG. 5, assuming that a screen resolution of the autostereoscopic display 410 is $W_2*H_2$, a size of every single pixel is $W_3*H_3$ (width*height), and the user's interpupillary distance is ED, then the coordinates of the user's left and right eyes relative to the autostereoscopic display 410 are ($W_2/2-ED/W_3/2, H_2/2$) and ($W_2/2+ED/W_3/2, H_2/2$), respectively. In addition, since the user is in the optimal viewing position, the distance of the user's eyes to the autostereoscopic display 410 is known as f. Using the known human eye coordinates and the positions BSL(x, y) and BSR(x, y) of the virtual manipulated object Bv in the left and right eye views, the three-dimensional coordinate V1 (x, y, z) of the virtual manipulated object Bv in the display coordinate system can be determined according to the simple geometric relationship as shown in FIG. 5.

Figure 6:
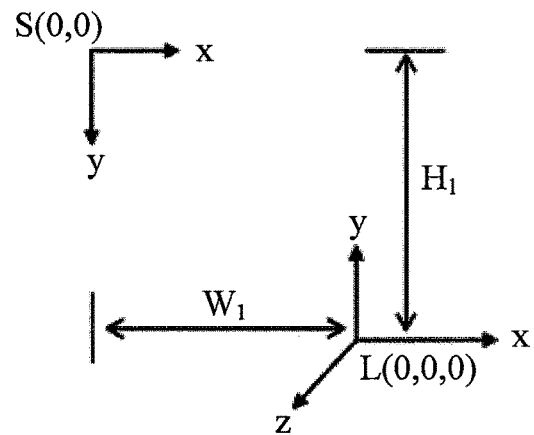
FIG. 6 is a schematic diagram showing coordinate conversion between a display coordinate system and a motion tracker coordinate system of FIG. 2.

FIG. 6 is a schematic diagram showing coordinate conversion between the display coordinate system and the motion tracker coordinate system of FIG. 2. The coordinate conversion to the motion tracker coordinate system may facilitate subsequent operations.

As shown in FIG. 6, the distance between the origin L(0, 0, 0) of the motion tracker coordinate system and the origin S(0, 0) of the display coordinate system in the x direction is denoted as $W_1$, and the distance in the y direction is denoted as $H_1$. The vertical distance from L(0, 0, 0) to the autostereoscopic display 210 is denoted as $D_1$ (FIG. 2). Since there is no relative rotation between the two coordinate systems, the conversion vector of the two coordinate systems is ($-W_1, H_1, -D_1$), which is denoted as $$T=[-W_1\ H_1\ -D_1] \quad (3)$$

The y direction of the display coordinate system is opposite to the y direction of the motion tracker coordinate system. Taking the motion tracker coordinate system as the standard, the y value of the display coordinate system is inverted, and the conversion matrix is denoted as $$A = \begin{bmatrix} 1 & 0 & 0 \\ 0 & -1 & 0 \\ 0 & 0 & 1 \end{bmatrix} \quad (4)$$

Thus, a pixel (x, y) on the autostereoscopic display 210 can be transformed into the motion tracker coordinate system by the conversion vector and the conversion matrix:

$$[x'y'z]=[x\ y\ 1]*WH*A+T \quad (5)$$

where $$WH = \begin{bmatrix} W_3 & 0 & 0 \\ 0 & H_3 & 0 \\ 0 & 0 & 1 \end{bmatrix}$$

represents a size coefficient matrix of the pixel, [x y 1] represents a homogeneous coordinate of the pixel (x, y), and [x', y', z] represents the coordinate of the pixel (x, y) in the motion tracker coordinate system.

In an embodiment, the coordinate determining module 422 is configured to convert the three-dimensional coordinates V1(x, y, z) of the virtual manipulated object Bv in the display coordinate system to a second spatial coordinate V2(x, y, z) in a second coordinate system (i.e., the motion tracker coordinate system) referencing the motion tracker 220 according to equation (5).

Referring back to FIG. 3, at step 330, the coordinate receiving module 423 receives an interactive action of the user's manipulating body 230 acquired by the motion tracker 220. The motion tracker 220, such as Leap Motion, is capable of detecting a real-world coordinate P1(x, y, z) of the manipulating body 230 in the motion tracker coordinate system, and provides information regarding actions of the manipulating body 230 by tracking the movement of the manipulating body 230. In some embodiments, the coordinate receiving module 423 may be stored as software in a memory (not shown) of the autostereoscopic display 410, and when read and executed, it operates to retrieve from a buffer, for example, the information provided by the motion tracker 220 regarding the action of the manipulating body 230.

At step 340, the interaction triggering module 424 determines whether an interaction condition is triggered based, at least in part, on the real-world coordinate V2(x, y, z) of the virtual manipulated object Bv and the real-world coordinate P1(x, y, z) of the manipulating body 230. In some embodiments, the interaction triggering module 424 may be stored as software in a memory (not shown) of the autostereoscopic display 410, and when read and executed, it operates to perform step 340.

In an embodiment, the interaction condition includes the distance Len between P1(x, y, z) and V2(x, y, z) satisfying $$\text{Len}(P1(x,y,z),V2(x,y,z))<\theta \quad (6)$$

where θ is a threshold. If equation (6) is satisfied, it is determined that the interaction condition is triggered.

In an embodiment, in addition to equation (6), the interaction condition further includes the current interactive action of the manipulating body 230 being a predetermined posture, such as a fist. The interaction triggering module 424 may identify the posture of the manipulating body 230 from the information provided by the motion tracker 220 regarding the actions of the manipulating body 230 using various posture recognition techniques (e.g., image matching). Posture recognition techniques are known in the art and are not described in detail herein. If equation (6) is satisfied and the current interactive action of the manipulating body 230 is a predetermined posture, it is determined that the interaction condition is triggered.

If it is determined that the interaction condition is not triggered, the control flow proceeds to step 330, and the coordinate receiving module 423 continues to retrieve from the buffer latest real-world coordinates of the manipulating body 230 acquired by the motion tracker 220. Instead, if it is determined that the interaction condition is triggered, the control flow proceeds to step 350.

At step 350, the view refreshing module 425 refreshes the left eye view and the right eye view based on the interactive action of the manipulating body 230 acquired by the motion tracker 220. In embodiments, the interactive action of the manipulating body 230 includes, but is not limited to, translation, rotation, and deformation. The view refreshing module 425 refreshes the left eye view and the right eye view in accordance with the interactive action of the manipulating body 230 identified by the interaction triggering module 424. For example, in response to the translational action of the manipulating body 230, the virtual manipulated object is translated in the left eye view and the right eye view; in response to the rotational action of the manipulating body 230, the virtual manipulated object is rotated in the left eye view and the right eye view; and in response to the deformation of the manipulating body 230, the virtual manipulated object is deformed in the left eye view and the right eye view.

The operation of the view refreshing module 425 will be described below by taking a translation action as an example. In this example, when the manipulating body 230 moves, the virtual manipulated object Bv perceived by the user also performs the same movement.

Assume that the manipulating body 230 moves to a new position coordinate, which is denoted as $$P1(x+x1, y+y1, z+z1) = P1(x,y,z) + (x1,y1,z1) \quad (7)$$

Then the new position coordinate of the virtual manipulated object Bv in the motion tracker coordinate system is $$V2(x+x1, y+y1, z+z1) = V2(x,y,z) + (x1,y1,z1) \quad (8)$$

According to the geometric relationship shown in FIG. 5, the two straight lines connecting the two eyes and the new position coordinates of the virtual manipulated object Bv intersect the screen plane of the autostereoscopic display 410 at two intersections, denoted as $BLL_1(x, y, z)$ and $BLR_1(x, y, z)$. Then, $BLL_1(x, y, z)$ and $BLR_1(x, y, z)$ are transformed into the screen coordinate system by the following equation, yielding the new coordinates $BSL_1(x, y, z)$ and $BSR_1(x, y, z)$ of the virtual manipulated object Bv in the left and right eye views:

$$BSL_1 = (BLL_1 - T) * A^{-1} WH^{-1} \quad (9)$$

$$BSR_1 = (BLR_1 - T) * A^{-1} WH^{-1} \quad (10)$$

$BSL_1$ and $BSR_1$ are in homogeneous coordinate form, and the two-dimensional coordinate forms are $BSL_1(x, y)$ and $BSL_1(x, y)$.

The motion vectors relative to the original position are $$Shift_L = BSL_1 - BSL \quad (11)$$

$$Shift_R = BSR_1 - BSR \quad (12)$$

Using equations (11) and (12) to refresh the position coordinates of the virtual manipulated object Bv in the left and right eye views, we have $$BSL' = BSL + Shift_L \quad (13)$$

$$BSR' = BSR + Shift_R \quad (14)$$

Thereby, the refreshing of the left and right eye views is completed.

More generally, various techniques may be described herein in the general context of software hardware components or program modules. The various modules described above with respect to FIGS. 3 and 4 may be implemented in hardware or in hardware in combination with software and/or firmware. For example, the modules may be implemented as computer program code/instructions that are configured to be executed in one or more processors and stored in a computer-readable storage medium. Alternatively, these modules may be implemented as hardware logic/circuitry. For example, in an embodiment, one or more of the display initiating module 421, the coordinate determining module 422, the coordinate receiving module 423, the interaction triggering module 424, and the view refreshing module 425 may be implemented together in an SoC. The SoC may include an integrated circuit chip (which includes a processor (e.g., a central processing unit (CPU), a microcontroller, a microprocessor, a digital signal processor (DSP), etc.), a memory, one or more communication interfaces, and/or one or more components in other circuits, and may optionally execute the received program code and/or include embedded firmware to perform functions. The features of the techniques described herein are platform-independent, meaning that these techniques can be implemented on a variety of computing platforms having a variety of processors.

Although the various operations are depicted in the drawings in a particular order, this should not be construed as requiring that the operations be performed in the particular order shown or in a sequential order, or that all of the operations shown be performed to achieve the desired result. For example, in step 320, although the real-world coordinate of the virtual manipulated object Bv is obtained by determining the first spatial coordinate of the virtual manipulated object Bv in the display coordinate system, and then by converting the first spatial coordinate into the second spatial coordinate in the motion tracker coordinate system, other embodiments are possible. For example, the real-world coordinate of the virtual manipulated object Bv may alternatively be obtained by converting the position coordinates of the virtual manipulated object Bv in the left and right eye views and the position coordinates of the user's eyes relative to the display to coordinates in the motion tracker coordinate system and then by determining the coordinate of the virtual manipulated object Bv in the motion tracker coordinate system. In certain circumstances, multitasking and parallel processing may be advantageous. Furthermore, the division of the various system components in the previously described embodiments should not be construed as requiring that all embodiments require such division, and it should be understood that the described program components and systems may generally be integrated into a single software product, or packaged in multiple software products.

Figure 7:
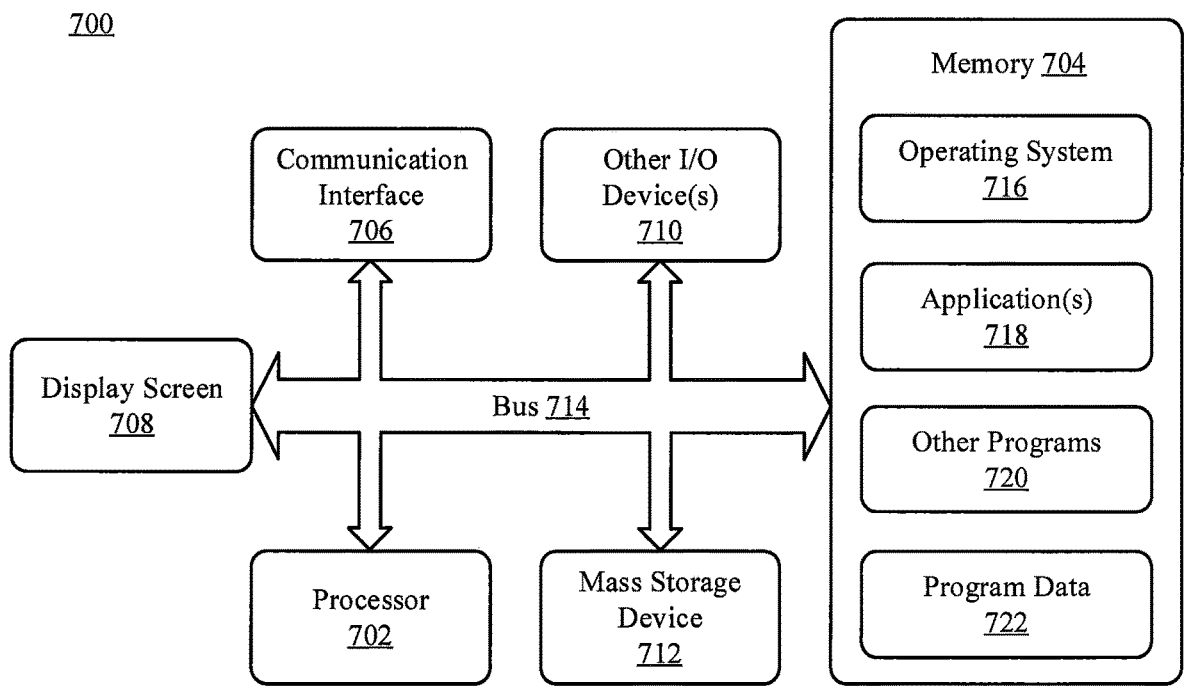
FIG. 7 is a schematic block diagram of an autostereoscopic display in accordance with an embodiment of the present disclosure.

FIG. 7 is a schematic block diagram of an autostereoscopic display 700 in accordance with an embodiment of the present disclosure. By example of example, the autostereoscopic display 210 and/or autostereoscopic display 410 may take the form of the autostereoscopic display 700.

The autostereoscopic display 700 may include at least one processor 702, a memory 704, a communication interface(s) 706, a display screen 708, other input/output (I/O) devices 710 and one or more mass storage devices 712 that are capable of communicating with each other, such as through a system bus 714 or other suitable connection.

The processor 702 may be a single processing unit or multiple processing units, all of which may include a single or multiple computing units or multiple cores. The processor 702 may be implemented as one or more microprocessors, microcomputers, microcontrollers, digital signal processors, central processing units, state machines, logic circuits, and/or any device that manipulates signals based on operational instructions. Among others, the processor 702 may be configured to acquire and execute computer-readable instructions stored in the memory 704, the mass storage device 712, or other computer-readable medium, such as program code of an operating system 716, program code of an application 718, and program code of other programs 720, and the like.

The memory 704 and the mass storage device 712 are examples of computer storage media for storing instructions that are executed by the processor 702 to implement the various functions previously described. For example, the memory 704 may generally include both volatile and non-volatile memory (e.g., RAM, ROM, etc.). In addition, the mass storage device 712 may generally include a hard disk drive, a solid state drive, a removable medium, including external and removable drives, a memory card, a flash memory, a floppy disk, an optical disk (e.g., CD, DVD), a storage array, a network attached storage, a storage area network, and so on. The memory 704 and the mass storage device 712 may be collectively referred to herein as a memory or computer storage medium, and may be a non-transitory medium capable of storing computer-readable, processor executable program instructions as computer program code. The computer program code can be executed by the processor 702 as a particular machine configured to implement the operations and functions described in the examples herein.

A plurality of program modules can be stored on the mass storage device 712. These programs include the operating system 716, one or more applications 718, other programs 720, and program data 722, and they can be loaded into the memory 704 for execution. Examples of such applications or program modules may include, for example, computer program logic (e.g., computer program code or instructions) for implementing the following components/functions: the display initiating module 421, the coordinate determining module 422, the coordinate reception module 423, the interactive triggering module 424, and the view refreshing module 425.

Although illustrated in FIG. 7 as being stored in the memory 704 of the autostereoscopic display 700, the modules 716, 718, 720, and 722, or portions thereof, may be implemented using any form of computer-readable medium that can be accessed by the autostereoscopic display 700. As used herein, the "computer-readable medium" includes at least two types of computer-readable media, that is, computer storage media and communication media.

The computer storage media includes volatile and non-volatile, removable and non-removable media implemented by any method or technology for storage of information, such as computer-readable instructions, data structures, program modules or other data. The computer storage media includes, but is not limited to, RAM, ROM, EEPROM, flash memory or other memory technology, CD-ROM, digital versatile disk (DVD), or other optical storage device, magnetic cartridge, magnetic tape, magnetic disk storage, or other magnetic storage device, or any other non-transport medium that can be used to store information for access by a computing device.

In contrast, the communication media can embody computer-readable instructions, data structures, program modules or other data in a modulated data signal, such as a carrier wave or other transport mechanism. The computer storage media as defined herein does not include the communication media.

The autostereoscopic display 700 may further include one or more communication interfaces 706 for exchanging data with other devices, such as through a network, direct connection, etc., as discussed above. Such a communication interface can be one or more of the following: any type of network interface (e.g., a network interface card (NIC)), wired or wireless (such as an IEEE 802.11 wireless LAN (WLAN)) interface, global microwave Access Interoperability (Wi-MAX) interface, Ethernet interface, Universal Serial Bus (USB) interface, cellular network interface, Bluetooth™ interface, Near Field Communication (NFC) interface, etc. The communication interface 706 can facilitate communication within a variety of network and protocol types, including wired networks (e.g., LAN, cable, etc.) and wireless networks (e.g., WLAN, cellular, satellite, etc.), the Internet, and the like. The communication interface 706 can also provide for communication with external storage devices (not shown), such as in storage arrays, network-attached storage, storage area networks, and the like.

Other I/O devices 710 may be devices that receive various inputs from users and provide various outputs to the user, and may include touch input devices, gesture input devices, cameras, keyboards, remote controls, mice, printers, audio inputs/output devices, and the like.

The foregoing are only specific embodiments of the present disclosure. It should be noted that various improvements and modifications may be made by those having ordinary skill in the art without departing from the principles of the present disclosure, and such improvements and modifications are considered to fall within the scope of the present disclosure.

What is claimed is:

1. A method for interacting with an autostereoscopic display, comprising:

initiating displaying by the autostereoscopic display a left eye view and a right eye view that include a virtual manipulated object;

determining a real-world coordinate of the virtual manipulated object perceived by a user located at a predetermined viewing position of the autostereoscopic display based on respective positions of the virtual manipulated object in the left eye view and the right eye view, the predetermined viewing position, and an interpupillary distance of the user, wherein the predetermined viewing position is at a predetermined distance from the autostereoscopic display, the predetermined distance being a focal length of a left eye or a right eye of the user;

determining a real-world coordinate and a posture of a manipulating body; and in response to a distance between the real-world coordinate of the virtual manipulated object and the real-world coordinate of the manipulating body being less than a first threshold and the posture of the manipulating body being a predetermined posture, receiving an interactive action of the manipulating body acquired by a motion tracker below the manipulating body and refreshing the left eye view and the right eye view based on the interactive action of the manipulating body acquired by the motion tracker, wherein the refreshing the left eye view and the right eye view based on the interactive action of the manipulating body acquired by the motion tracker comprises:

determining a change of the real-world coordinate of the virtual manipulated object based on the interactive action of the manipulating body; and refreshing the left eye view and the right eye view based on the change of the real-world coordinate of the virtual manipulated object, the predetermined viewing position, and the interpupillary distance of the user.

2. The method of claim 1, wherein the determining the real-world coordinate of the virtual manipulated object perceived by the user located at a predetermined viewing position of the autostereoscopic display based on respective positions of the virtual manipulated object in the left eye view and the right eye view, the predetermined viewing position, and the interpupillary distance of the user comprises:

determining a first spatial coordinate of the virtual manipulated object perceived by the user in a first coordinate system referencing the autostereoscopic display based on respective positions of the virtual manipulated object in the left eye view and the right eye view, the predetermined viewing position, and the interpupillary distance of the user; and
converting the first spatial coordinate to a second spatial coordinate in a second coordinate system referencing the motion tracker.

3. The method of claim 1, wherein the determining a real-world coordinate and a posture of a manipulating body comprises:
receiving as the real-world coordinate of the manipulating body, a third spatial coordinate, acquired by the motion tracker, of the manipulating body in a second coordinate system referencing the motion tracker.

4. The method of claim 1, wherein the refreshing the left eye view and the right eye view comprises at least one operation selected from a group consisting of:
translating the virtual manipulated object in the left eye view and the right eye view in response to translation of the manipulating body;
rotating the virtual manipulated object in the left eye view and the right eye view in response to rotation of the manipulating body; and
deforming the virtual manipulated object in the left eye view and the right eye view in response to deformation of the manipulating body.

5. A computing device for interacting with an autostereoscopic display, comprising:
a display initiating module configured to initiate displaying by the autostereoscopic display a left eye view and a right eye view that include a virtual manipulated object;
a first determining module configured to determine a real-world coordinate of the virtual manipulated object perceived by a user located at a predetermined viewing position of the autostereoscopic display based on respective positions of the virtual manipulated object in the left eye view and the right eye view, the predetermined viewing position, and an interpupillary distance of the user, wherein the predetermined viewing position is at a predetermined distance from the autostereoscopic display, the predetermined distance being a focal length of a left eye or a right eye of the user;
a second determining module configured to determine a real-world coordinate and a posture of a manipulating body; and
a view refreshing module configured to: in response to a distance between the real-world coordinate of the virtual manipulated object and the real-world coordinate of the manipulating body being less than a first threshold and the posture of the manipulating body being a predetermined posture, receive an interactive action of the manipulating body acquired by a motion tracker below the manipulating body, determine a change of the real-world coordinate of the virtual manipulated object based on the interactive action of the manipulating body, and refresh the left eye view and the right eye view based on the change of the real-world coordinate of the virtual manipulated object, the predetermined viewing position, and the interpupillary distance of the user.

6. The computing device of claim 5, wherein the first determining module is further configured to determine a first spatial coordinate of the virtual manipulated object perceived by the user in a first coordinate system referencing the autostereoscopic display based on respective positions of the virtual manipulated object in the left eye view and the right eye view, the predetermined viewing position, and the interpupillary distance of the user, and to convert the first spatial coordinate to a second spatial coordinate in a second coordinate system referencing the motion tracker.

7. The computing device of claim 5, wherein the second determining module is configured to receive as the real-world coordinate of the manipulating body, a third spatial coordinate, acquired by the motion tracker, of the manipulating body in a second coordinate system referencing the motion tracker.

8. The computing device of claim 5, wherein the view refreshing module is configured to perform at least one operation selected from a group consisting of:
translating the virtual manipulated object in the left eye view and the right eye view in response to translation of the manipulating body;
rotating the virtual manipulated object in the left eye view and the right eye view in response to rotation of the manipulating body; and
deforming the virtual manipulated object in the left eye view and the right eye view in response to deformation of the manipulating body.

9. An autostereoscopic display system comprising:
an autostereoscopic display; and
a computing device comprising:
a display initiating module configured to initiate display by the autostereoscopic display a left eye view and a right eye view that include a virtual manipulated object;
a first determining module configured to determine a real-world coordinate of the virtual manipulated object perceived by a user located at a predetermined viewing position of the autostereoscopic display based on respective positions of the virtual manipulated object in the left eye view and the right eye view, the predetermined viewing position, and an interpupillary distance of the user, wherein the predetermined viewing position is at a predetermined distance from the autostereoscopic display, the predetermined distance being a focal length of a left eye or a right eye of the user;
a second determining module configured to determine a real-world coordinate and a posture of a manipulating body; and
a view refreshing module configured to: in response to a distance between the real-world coordinate of the virtual manipulated object and the real-world coordinate of the manipulating body being less than a first threshold and the posture of the manipulating body being a predetermined posture, receive an interactive action of the manipulating body acquired by a motion tracker below the manipulating body, determine a change of the real-world coordinate of the virtual manipulated object based on the interactive action of the manipulating body, and refresh the left eye view and the right eye view based on the change of the real-world coordinate of the virtual manipulated object, the predetermined viewing position, and the interpupillary distance of the user.

10. The autostereoscopic display system of claim 9, further comprising the motion tracker.

11. The autostereoscopic display comprising:
a memory configured to store an interactive application; and
a processor configured to execute the interactive application to implement the method of claim 1.

12. A computer-readable storage medium having stored thereon a computer program that, when executed by a processor, implements the method of claim 1.

* * * * *